Figure 1:
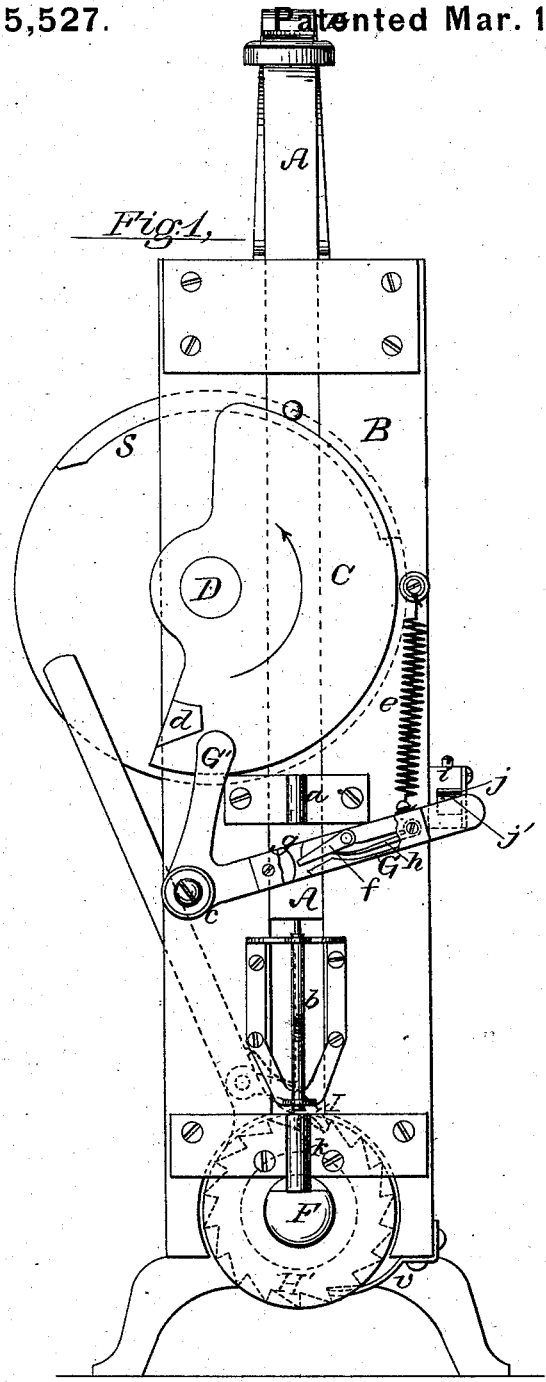

3 Sheets—Sheet 1

A. KNOWLTON.
Nailing-Machine.

No. 225,527. Patented Mar. 16, 1880.

WITNESSES

INVENTOR
Albion Knowlton,
by M. Bailey
his ATTORNEY.

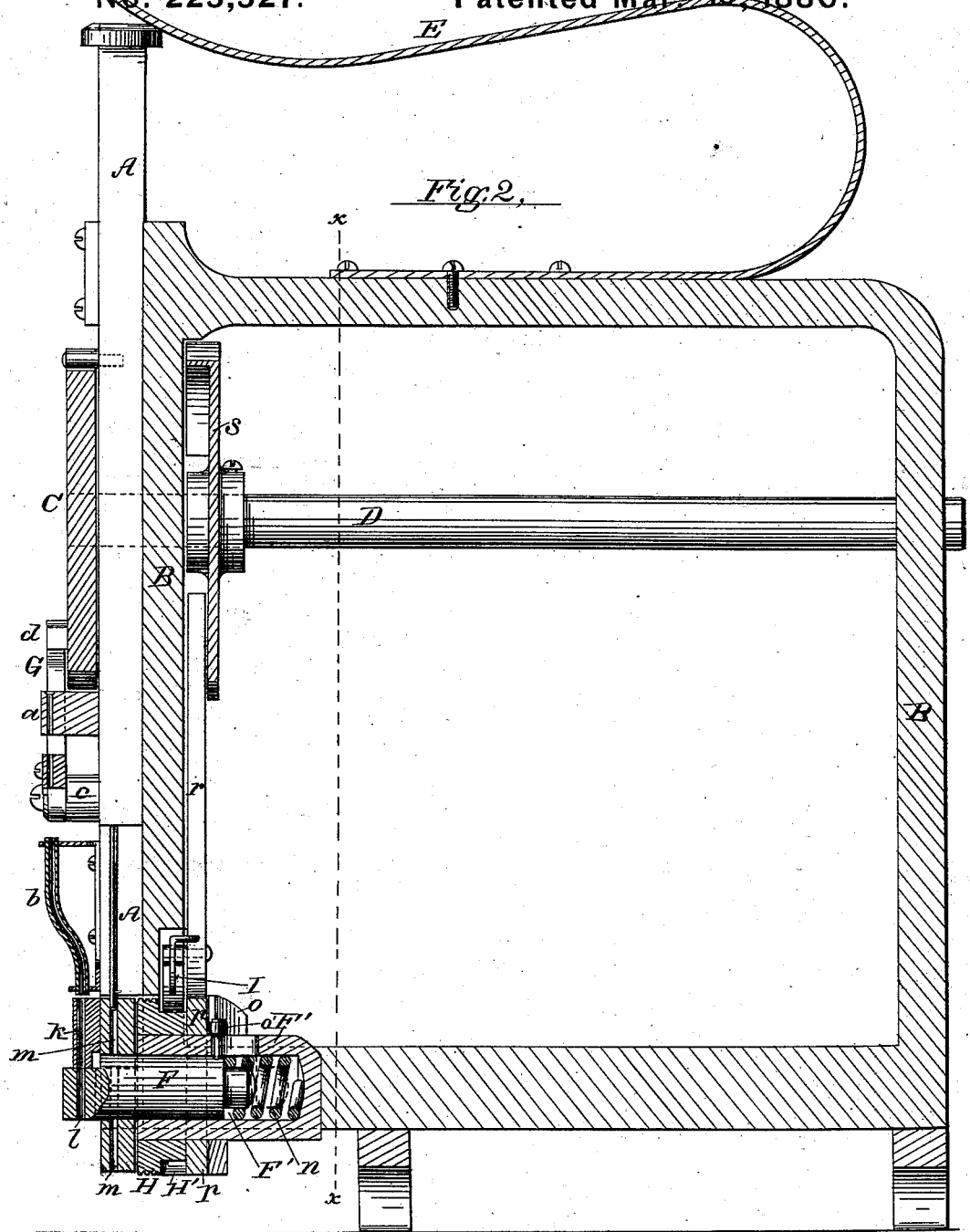

A. KNOWLTON.
Nailing-Machine.
No. 225,527. Patented Mar. 16, 1880.
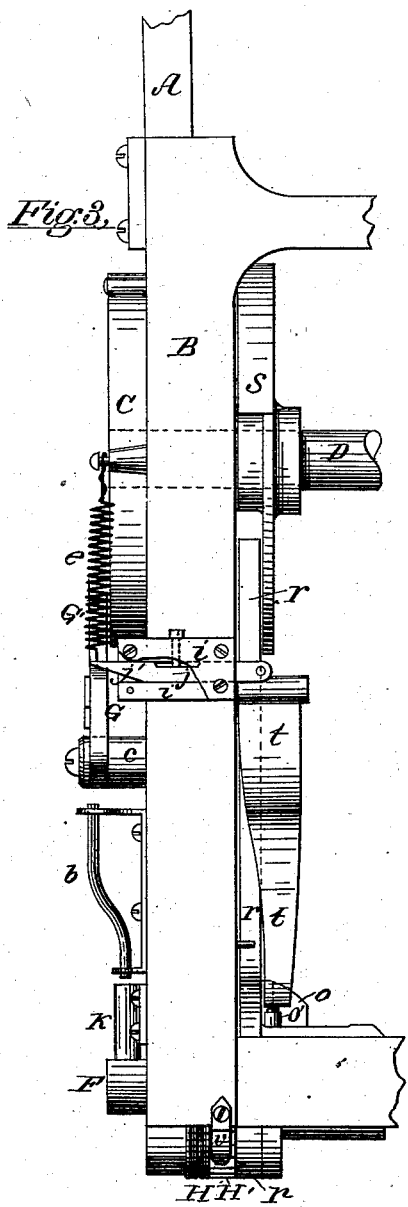
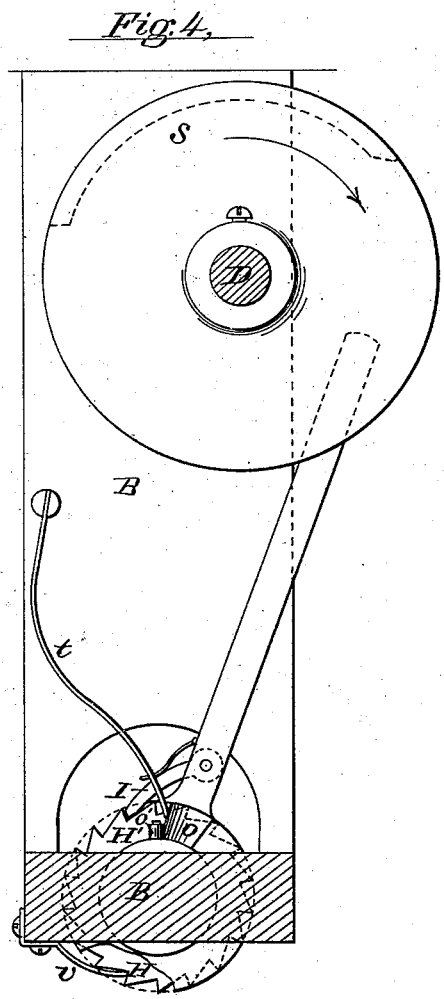
INVENTOR
Albion Knowlton,
by M Bailey
his ATTORNEY

UNITED STATES PATENT OFFICE.

ALBION KNOWLTON, OF BOSTON, MASSACHUSETTS.

NAILING-MACHINE.

SPECIFICATION forming part of Letters Patent No. 225,527, dated March 16, 1880.

Application filed January 20, 1880.

*To all whom it may concern:*

Be it known that I, ALBION KNOWLTON, of Boston, Massachusetts, have invented certain new and useful Improvements in Nailing-Machines, of which the following is a specification.

My invention relates to machines for nailing soles to uppers in the manufacture of boots and shoes. It has particular reference to means for regulating the length of the wire-feed while the machine is in operation, and also to the arrangement of the reciprocating cutter and carrier, by means of which the proper length of wire for the nail is first severed from the main wire and then conveyed to the point where it is in position to be acted on by the driver.

The wire-feed device consists of grasping jaws or dogs, one or both of which are movable, carried by a reciprocating feed-bar, whose movement in one direction is positive and always to the same point, while its movement in the other direction is due to the reaction of a spring, and may be varied so as to vary the extent of reciprocation, and consequently the length of feed.

The means which I employ to thus vary the extent of reciprocation consists of a tapered or wedge-shaped slide-bar mounted on the machine-frame and arranged to project in the path of the feed-bar, constituting a stop to limit the extent of movement of the said bar due to the reaction of the spring. The jaws or dogs take hold of the wire only when the feed-bar moves in the direction requisite for the feed. When it moves in the opposite direction the jaws or dogs slip by the wire without acting on it. The tapered or wedge-like slide-bar is adapted to be connected with mechanism operated by the hand or foot of the operator or otherwise, so that it can be shifted to increase or decrease at pleasure the length of feed, and consequently the length of nail.

As to the cutter and carrier, I combine it with a rotary feed wheel or disk for the work in such a way that it shall reciprocate axially through said feed-wheel.

These and other features of my invention can, however, best be explained and understood by reference to the accompanying drawings, in which—

Figure 1 is a front elevation of so much of a nailing-machine embodying my improvements as is needed to illustrate my invention. Fig. 2 is a longitudinal vertical central section of the same. Fig. 3 is a side elevation of the head or front part of the machine. Fig. 4 is a sectional elevation of the head of the machine from the rear, the line of section being on line $x$ $x$, Fig. 2.

The vertically-reciprocating driver A is arranged in proper bearings in the frame B of the machine, and is operated in the usual way in one direction by the lifting-cam C on the main shaft D, and in the other direction by the depressing-spring E.

The wire for the nails is supplied in any ordinary or suitable way, passing down through tubular guides $a$ $b$ to the reciprocating cutter and carrier F.

The feed device is arranged on the front of the machine between the upper and lower guides, $a$ $b$. It consists of the feed-bar G, which, in this instance, obtains its movement of vertical reciprocation by being hung on a horizontal pivot, $c$, on which it is caused, at proper intervals, to vibrate up and down. The means which I employ in the present instance to actuate it consists of a wiper-stud, $d$, on the face of the revolving cam C, which acts on an upright arm, G', attached to the bar G, and gives a downward movement to said bar. The movement in the upward direction is effected by a recoil-spring, $e$, fastened at one end to the machine-frame and at the other end to the bar G, which acts the moment the stud $d$ clears the arm G' to draw up the feed-bar. The latter carries a pivoted dog, $f$, between which and a shoulder or fixed jaw, $g$, on the said bar passes the wire from the guide $a$. The dog is arranged, as shown, with its acting end below its pivot, so that it will grasp the wire only when the feed-bar descends, a spring, $h$, holding it up in place with yielding pressure, so that when the feed-bar rises the dog may yield and slip by the wire.

To regulate the length of feed, I mount in proper bearings $i$ on the machine-frame a slide-bar, $j$, which is arranged so that it may project more or less over and in the path of the feed-bar, as shown. The end of the slide which thus projects over the feed-bar is tapered or inclined from front to rear on that face contiguous to the feed-bar, as shown at $j'$. Under this arrangement it will be seen that the farther forward the slide is projected the sooner will the upwardly-moving feed-bar come in contact with it, and consequently, by moving the slide in or out more or less, the upward movement of the feed-bar can be arrested at varying points, thus enabling me to regulate the length of feed at pleasure.

In practice it rarely happens that more than two lengths of nail are required in nailing a shoe, one length for the shank and the other length for the fore part. If, therefore, stops be provided which shall regulate the range of movement of the slide—as, for instance, a stop-pin at each extreme, so that when the slide is moved forward to one point it will give the feed requisite for the shorter nails, and when moved backward to the other point it will allow the increased feed requisite for the longer nails—the slide can, while the machine is in full operation, be instantly shifted from the one position to the other whenever it is required, and it can for this purpose be connected with any ordinary or suitable operating mechanism in convenient proximity to the hand or foot of the operator.

I remark that the reciprocatory movement of the feed-bar may be obtained in other ways and by other arrangement. It can, for instance, instead of vibrating on a pivot, have a movement of rectilinear reciprocation.

The lower part of the guide-tube, from which the wire passes to the reciprocating carrier, is made of hardened steel, (shown at $k$,) its under face in contact with the upper flat face of the reciprocatory carrier F, these two faces acting to shear or cut off from the main wire that portion which extends into the tubular passage $l$ in the carrier. The carrier has a reciprocatory movement from front to rear in such manner that when it has completed its forward movement the passage $l$ will be in line with the wire-passage in the tubular guide $k$, and when it completes its rearward movement said passage $l$ will be directly in line with and form a continuation of the tubular passage $m$, through which the driver plays, the result being that the piece of wire cut off from the main wire and remaining in the passage $l$ will be conveyed directly under the driver in position for the latter to drive it into the work beneath.

The feed for the shoe or boot consists of a feed-wheel, H, which has a scored or serrated periphery, and is provided with a ratchet, H', which is engaged by a pawl, I, through whose instrumentality an intermittent movement of partial rotation is imparted to the feed-wheel in the intervals between the driving of the nails.

The carrier and cutter F plays through the feed-wheel, being mounted in a tubular bearing, F', which forms the journal of the feed-wheel. Within the tubular bearing F', and in rear of the carrier, is a spring, $n$, which tends to force the carrier forward.

The rearward movement of the carrier is effected by a cam, $o$, on the hub $p$ of the oscillating lever $r$, to which lever is also pivoted the pawl I, as shown in Fig. 4. The cam $o$ acts on a pin, $o'$, on the carrier. The lever gets its movement from a cam, $s$, on shaft D, and a spring, $t$, which holds it against the cam with yielding pressure.

The hub $p$ of the lever is mounted loosely on the journal or axle F', and said lever when in movement operates simultaneously the feed-wheel and the carrier. A retaining-pawl, $v$, fixed to the machine-frame and engaging the feed-wheel ratchet, prevents any backward movement of said wheel.

In lieu of using an oscillating lever, I can employ a vertically-reciprocating bar provided with an incline or wedge which shall play in a slot in the carrier and cause it to move back against the stress of the spring $n$, while on said vertically-sliding bar may be mounted the pivoted feed-pawl I, the bar obtaining its movement from a cam, against which its upper end is held by a suitable spring.

I have not deemed it necessary to show the horn or other device used to uphold the shoe or work against the feed-wheel. Said work-supporting device may be of any ordinary and suitable form and construction.

When the machine is doing work its operation is as follows: The feed-bar moves down and feeds the requisite length of wire into the cutter and carrier F, which at this time is in its forward position. The bar then instantly returns to its uppermost position, (determined by the inclined slide-bar,) while at the same time the carrier moves back, acting to cut off the length of wire needed for the nail and to carry it directly under the driver. At the same time the work is fed properly along by the feed-wheel. The driver then descends and drives the nail into the work, then rises. The feed-bar then begins to again operate as above described, and so on.

Having now described my improvements, what I claim, and desire to secure by Letters Patent, is—

1. In a nailing-machine, the vertically-reciprocating feed-bar and pivoted spring-dog carried by the same, and adapted to act in conjunction with a fixed jaw on said feed-bar, as described, in combination with the tapered slide-bar for arresting the upward movement of said feed-bar, substantially as hereinbefore set forth.

2. In a nailing-machine, the combination, substantially as hereinbefore set forth, of the rotary feed-wheel and the reciprocatory cutter and carrier arranged to play back and forth through said wheel.

3. The rotary feed-wheel, in combination with the reciprocatory cutter and carrier, the stationary wire-guide tube, with its lower end acting as a fixed blade in conjunction with the carrier and the driver, and passage through which the same moves, substantially as hereinbefore set forth.

4. The vibrating feed-bar and wire-grasping mechanism carried by the same, in combination with the rotary wiper cam or stud, the reacting-spring, and the tapered slide-bar, substantially as and for the purpose hereinbefore set forth.

In testimony whereof I have hereunto set my hand this 19th day of January, 1880.

ALBION KNOWLTON.

Witnesses:
E. A. DICK,
M. GEORGII.